United States Patent
Phares et al.

[11] 3,731,344
[45] May 8, 1973

[54] IN-FEED FOR AUTOMATIC CUT-UP SAW

[75] Inventors: Michael W. Phares, Phoenix, Ariz.; Paul E. Young, Cedar Falls, Iowa

[73] Assignee: The Pillsbury Company, Minneapolis, Minn.

[22] Filed: Feb. 1, 1971

[21] Appl. No.: 111,470

[52] U.S. Cl. .................................................. 17/11
[51] Int. Cl. ........................................... A22c 21/00
[58] Field of Search ................................. 17/11, 52

[56] References Cited

UNITED STATES PATENTS

| | | |
|---|---|---|
| 2,807,046 | 9/1957 | Hebenheimer .......................... 17/11 |
| 2,766,477 | 10/1956 | Dahlberg ................................. 17/11 |
| 3,624,866 | 12/1971 | Crappell ................................. 17/11 |

FOREIGN PATENTS OR APPLICATIONS

| | | |
|---|---|---|
| 1,429,817 | 4/1969 | Germany ................................. 17/11 |

Primary Examiner—Lucie H. Laudenslager
Attorney—Ronald E. Lund, James V. Harmon and Michael D. Ellwein

[57] ABSTRACT

A poultry wing and breast saw is constructed of laterally spaced parallel longitudinally extending chain conveyors for transporting poultry past a plurality of blades employed for removing wings as well as for subdividing the bird longitudinally. Poultry is introduced into the inlet end thereof by the provision of a feed mechanism consisting of an endless feed conveyor composed of a chain provided with longitudinally spaced poultry supporting fixtures or buckets positioned to travel toward the inlet of the saw assembly. Each bucket includes side members which support the body of the bird such that the wings are in the proper position to enter the saw mechanism and a pusher plate at the rearward end thereof for transferring the poultry pieces into the saw assembly.

7 Claims, 5 Drawing Figures

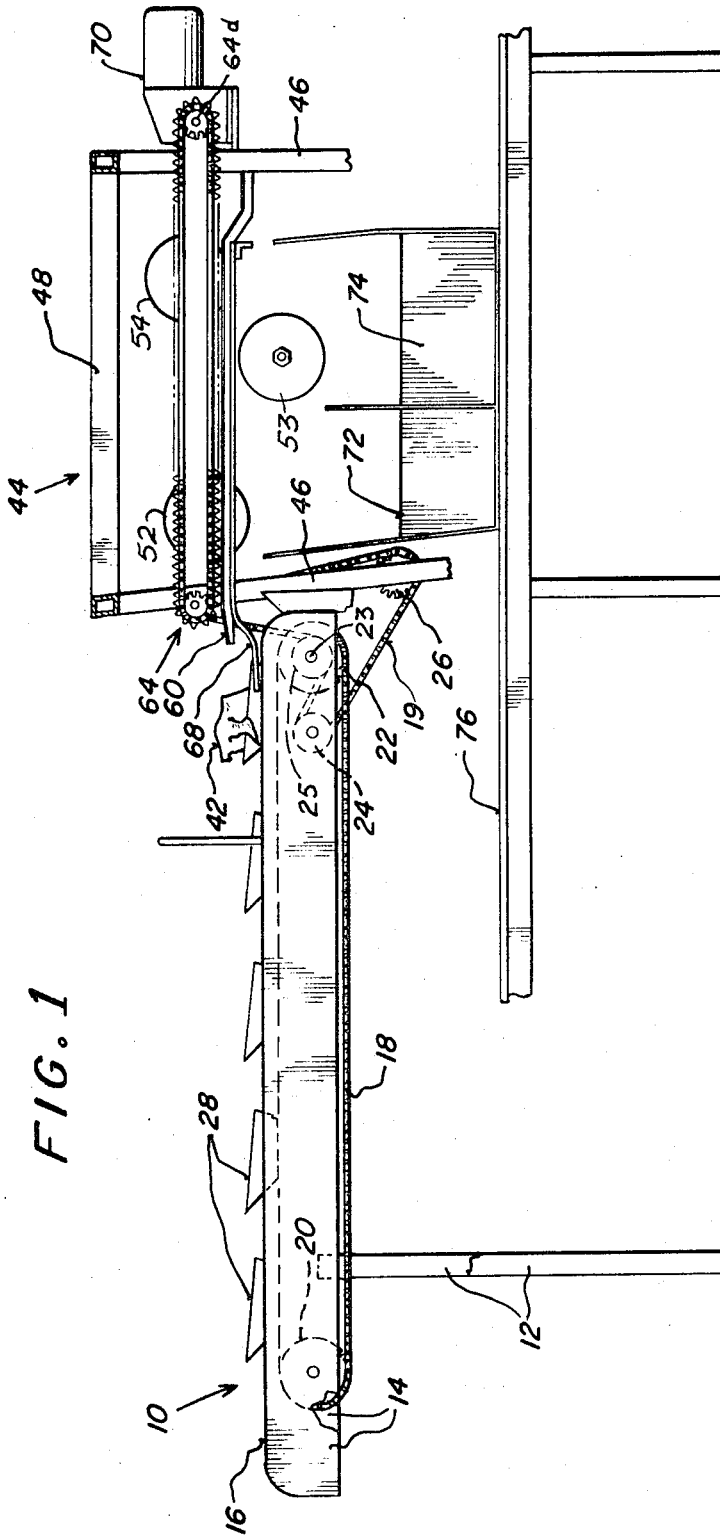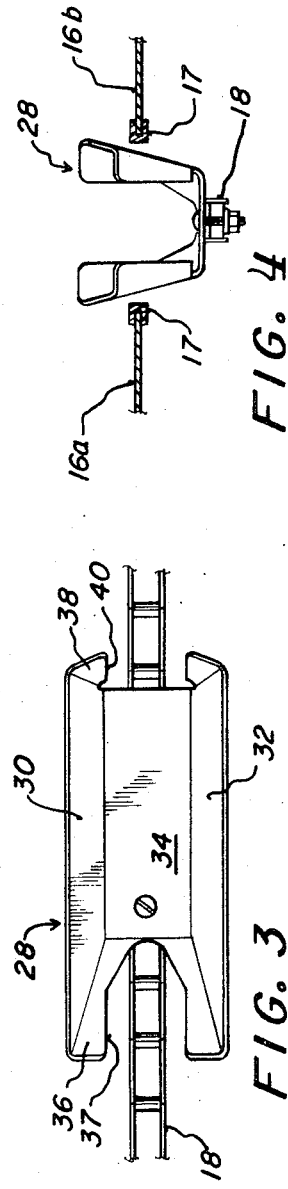
INVENTOR
Michael W. Phares
Paul E. Young
BY
James V. Carmon
ATTORNEY

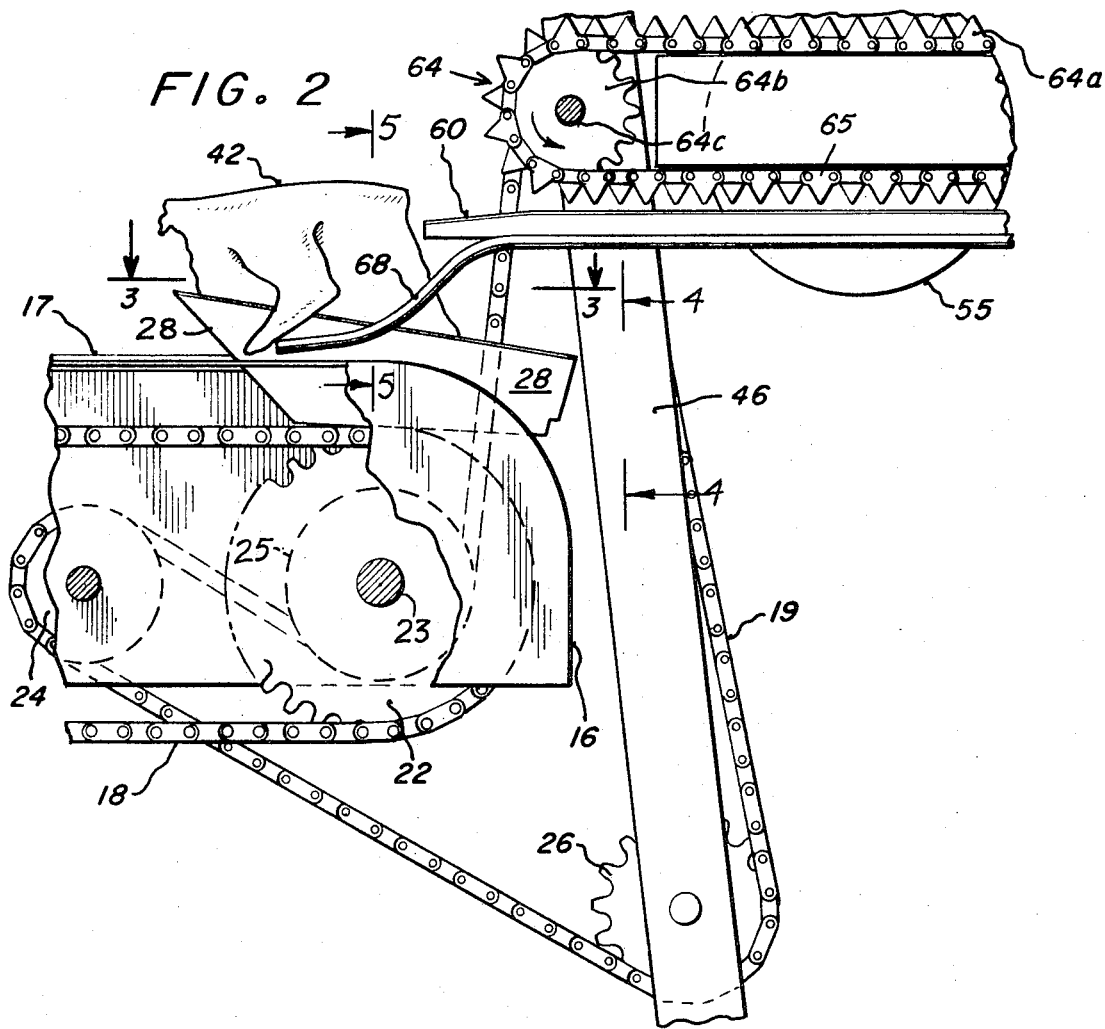
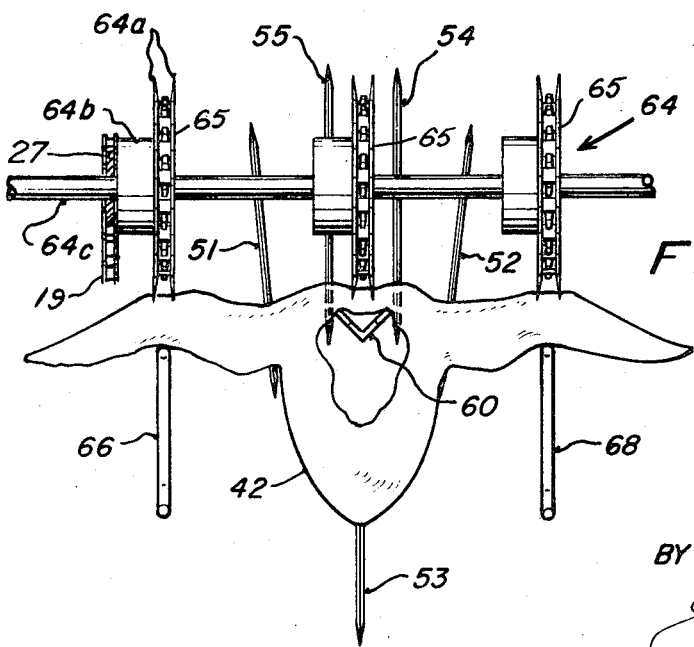

IN-FEED FOR AUTOMATIC CUT-UP SAW

FIELD OF THE INVENTION

The present invention relates to equipment for transferring and cutting meat products and more particularly to apparatus for feeding and cutting meats such as poultry.

BACKGROUND OF THE INVENTION

The automated cutting of poultry and other meat products for the purpose of producing packaged trays of cut meats has been developing at a rapid rate and has resulted in a number of innovations in the automated saws employed for cutting the poultry into the desired assortment of pieces. While such automated saws have the capacity to handle poultry at a relatively high rate, for example more than 60 birds per minute, an operator cannot successfully feed such a machine at a speed of greater than 30 to 40 birds per minute. Moreover, a safety hazard is presented since the inlet end of such a machine cannot be totally guarded.

OBJECTS OF THE INVENTION

It is an object of the invention to provide an improved poultry saw and feed mechanism with the following characteristics and advantages: a) safe operation, b) increased speed of feeding pieces that are to be cut, c) proper orientation of parts entering the saw feeding conveyor, d) provision for presenting properly oriented birds at a relatively high speed to the saw conveyor, e) means for transferring the parts into the saw conveyor with a provision for allowing the transfer means to clear the bird locating rod and f) provision for properly supporting and orienting the wings for entry into the saw feeding conveyor.

SUMMARY OF THE INVENTION

The invention includes a meat saw assembly and a means for introducing meat products into the inlet end of the same. Meat products are introduced by a feed mechanism consisting of a driven transfer means including at least one supporting fixture or bucket positioned to travel toward the inlet of the saw assembly. Each fixture includes side members which orient the meat product and in the case of poultry include members for supporting the body of the bird in a predetermined position such that the wings are in the proper position to enter the saw assembly. A pusher plate is provided for transferring the poultry pieces into the saw assembly.

DESCRIPTION OF THE DRAWINGS

FIG. 1 is a side elevational view of a preferred embodiment of the invention.

FIG. 2 is a partial enlarged side elevational view partly broken away of a portion of the apparatus shown in FIG. 1.

FIG. 3 is a plan view of the bird holding fixture taken on line 3—3 of FIG. 2.

FIG. 4 is an elevational view taken on line 4—4 of FIG. 2.

FIG. 5 is an elevational view taken on line 5—5 of FIG. 2.

DESCRIPTION OF THE PREFERRED EMBODIMENT

With reference to the figure and particularly FIG. 1, there is shown a feed conveyor 10 for advancing poultry pieces toward a saw assembly 44, that is, from left to right in the figure. The conveyor 10 comprises a supporting framework only a part of which is shown at 12 upon which is supported a pair of longitudinally extended vertically disposed side plates 14. Secured to plates 14 is a longitudinally extending top plate 16 which functions primarily as a chain guard. It is composed of two laterally spaced longitudinally extending sections 16a and 16b, as seen in FIG. 4. The inward edges of these plates are provided with plastic strips 17 that function as guides for the holding fixtures 28 to be described below. The conveyor 10 and plate 16 as well as associated structure can be positioned horizontally as shown or can, if desired, be inclined upwardly or downwardly at a slight angle, e.g., 15°–20° proceeding toward the inlet of the saw 44 as operating conditions require.

The conveyor 10 comprises an endless chain 18 entrained over longitudinally spaced chain sprockets 20 and 22 which are journaled for rotation on the framework 12. The sprocket 22 is supported on a shaft 23 to which is affixed a second sprocket 25 over which is entrained a drive chain 19 that extends from sprocket 25 toward the left over a sprocket 24, thence downwardly over sprocket 26 and finally over a sprocket 27 (FIG. 5) affixed to the shaft 64c of the saw 44.

Secured at regular intervals on the chain 18 are a plurality of longitudinally spaced holding fixtures 28 only some of which are shown. The fixtures 28 comprise bird orientation supports 30 and 32 which in this instance are formed from inclined longitudinally extending side walls that are integral at their lower edges with a bottom wall 34 which is itself attached to the chain 18. As will be described more fully below, the bird orientation supports 30 and 32 are appropriately positioned to place the bird in a predetermined position in which the wings of the birds 42 can properly enter the saw 44. The rearward edge of the holding fixture 28 comprises a plate 36 positioned transversely and inclined with respect to the vertical at an angle of about 45° with its upper edge trailing the lower edge. A notch or opening 37 is positioned in the center of plate 36 to provide a means for accommodating a longitudinally extending bird locating bar 60 which will be described below. The fixture 28 is also provided with a front wall 38 having a centrally disposed notch 40, again to provide clearance for the locating bar 60.

During operation, birds 42 can be placed very quickly in the fixtures 28 and are appropriately supported by the bottom wall 34 and the walls 30 and 32, so that the body opening of the bird is oriented longitudinally with respect to its axis of motion. At the same time the wings of bird 42 are properly oriented to enter the saw 44. The wings usually hang down at an inclined angle when the bird is in the fixture 28.

The saw 44 comprises a supporting framework composed of columns 46 and beams 48, only some of which are shown, to provide a rigid supporting structure. Upon this framework are provided a plurality of saws 51 through 55 which can be arranged in various ways. It is, however, preferred to position the blades 51 and 52 as seen in FIG. 5 on an inclined axis, to locate the blade 53 on a vertical centrally disposed axis and the blades 54 and 55 at a higher elevation than the blades 51 and 52 and which in this instance are parallel to one another so that two longitudinally extending laterally spaced cuts are made equidistant from the spinal cord on the dorsal side of the bird. Each bird is oriented with respect to the blades by means of horizontally disposed longitudinally oriented body cavity locating bar 60 which is rigidly supported on the framework in position to pass through the body cavity of the bird 42 as seen in FIG. 5 when the bird is introduced into the saw 44. The endless chain conveyor 64 provided with teeth 64a engages the tops of the wings to advance the wings longitudinally through the apparatus or away from the viewer as seen in FIG. 5. The center chain of the conveyor functions by itself to carry the body through the apparatus after the wings have been removed. The wings are supported and elevated by longitudinally extending parallel and horizontally disposed stationary guide rods 66 and 68 until they extend substantially horizontally as seen in FIG. 5 and are removed from the body by blades 51 and 52. Blade 53 divides the ventral side of the body longitudinally. The leading edges of rods 66 and 68 at the left in FIGS. 1 and 2 are positioned at a suitable elevation to engage the lower side of the wings which are already properly located by the walls 30, 32. The conveyor 64 consists of three laterally spaced chains 65 entrained over sprockets 64b which are supported upon laterally extending horizontally disposed drive shafts 64c and 64d. The entire saw assembly 44 including blades 51 through 55 and the conveyor 64 can be purchased commercially, for example from the Gainesville Machinery Company of Gainesville, Georgia or the Horace De Long Maintenance Inc. of Gainesville, Georgia. The conveyor 64 is suitably driven through a speed reducer by a motor 70 in the direction as shown in FIG. 2 thereby conveying the birds from left to right as seen in the figure past the saws 51 through 55. The saws 51 through 55 are rotated at high speed by a suitable means such as electric motors (not shown).

Positioned below the saw assembly 44 on a table 76 is a part collection bin divided into 2 sections 72 and 74 for receiving the wings and bodies respectively which are periodically removed and further processed or placed in packages for retail sale.

The operation of the apparatus will now be described.

The saw assembly 44 and in-feed conveyor 10 are started by energizing the motor 70. The holding fixtures 28 will then travel from left to right toward the inlet of the saw assembly 44 which comprises the area in the vicinity of the left end of bar 60. The motors that rotate the saws are then actuated. The operator then places the birds in the fixtures 28 with their bodies oriented parallel to the path of motion. When this is done, the body and wings will be located by the walls 30, 32. It should be recognized that there is no safety hazard involved in placing the birds in the fixtures and that this can be done very rapidly since the fixtures themselves are largely responsible for orienting the birds and that this is due primarily to the dual function of the side walls 30, 32 which engage the sides of the body thereby positioning the bird as well as the wings. It will be seen that as the birds travel from left to right in FIGS. 1 and 2 the guide rods 66, 68 will engage the lower edges of the wings raising them somewhat to the proper position to be engaged by conveyor chain 65. At the same time, the orientation bar 60 will enter the body cavity and will pass through the notch 37 in plate 36. As the bucket travels around the sprocket 22 the plate 36 will, by pressing against the rearward surface of the bird, effectively transfer the bird onto the bar 60 and into engagement with the conveyor 64. Cutting of the back and wings will then take place as described hereinabove.

What is claimed is:

1. For use with a poultry saw assembly including a supporting framework, a plurality of cutting elements adapted to sever appendages from the major body section of poultry, and a means for directing the poultry body section past the cutting elements, a feed conveyor comprising:
   a. an endless flexible driving element entrained over a pair of spaced rotatable drive elements and having holding fixtures thereon,
   b. said feed conveyor having an inlet end defining a loading station accessible to operators for the placement of poultry thereon and being driven to carry the poultry to the poultry saw assembly from the loading station toward the cutting elements and into engagement therewith to thereby cut the appendages therefore,
   c. a drive means connected to the flexible endless element for advancing the holding fixtures along an axis extending from the loading station toward the inlet of the saw assembly
   d. said holding fixtures being longitudinally spaced apart and being secured to said endless flexible element,
   e. said fixtures each having poultry engaging means for supporting the appendages to hold them in positions extending laterally from the fixture across the cutting edge of the cutting elements,
   f. each of the holding fixtures also including means for engaging the poultry product to orient the longitudinal axis thereof in alignment with the axis of motion of the holding fixtures toward the inlet of the saw assembly.

2. The apparatus of claim 1 wherein a means for engaging the meat product to force the meat product into the saw assembly comprises a plate affixed to the rearward edge of the fixture for engaging the trailing surface of the meat product to thereby press against the trailing surface of the meat product as the fixture moves toward said inlet to transfer the meat product into the saw assembly.

3. The apparatus of claim 2 wherein, the saw assembly includes an elongated poultry body orientation bar extending from the inlet end thereof to a position adapted to guide the poultry past the saw blade and said transfer plate is provided with an opening therein to accommodate the end of the orientation bar as the poultry product is forced onto the end of the orientation bar.

4. An apparatus for cutting meat products comprising a supporting framework, a saw assembly mounted on the framework including a blade for severing the meat product into pieces when traveling therethrough, said saw assembly having an inlet, a means for directing the meat product to pass through the apparatus into position relative to the blade to be severed thereby as the product travels therethrough, an in-feed conveyor comprising an endless flexible driving element entrained over a pair of spaced rotatable drive members, a plurality of longitudinally spaced apart holding fixtures secured to the endless flexible element, a drive means connected to the flexible endless element for advancing the holding fixtures along an axis extended from a remote point toward the inlet of the saw assembly, each of the holding fixtures comprising a pair of spaced members for engaging opposite sides of the meat product to orient the longitudinal axis thereof with the axis of motion of the holding fixtures toward the inlet of the saw assembly.

5. The apparatus of claim 4 wherein body orientation elements are provided on the holding fixture for engaging the body of a chicken such that the wings are located in a predetermined position adapted to enter the saw assembly whereby the wings can be severed from the body by said saw assembly.

6. The apparatus of claim 5 wherein a pressing element is provided on the in-feed conveyor at the rear of the holding fixture in a position to engage the trailing end of the poultry to transfer the poultry into the inlet end of the saw assembly.

7. The apparatus according to claim 6 wherein the saw assembly includes endless conveyor means for transferring the poultry therethrough past the cutting means and said in-feed conveyor connected in driving engagement with the saw assembly conveyor to move in synchronization therewith feeding meat products thereto at timed intervals.

* * * * *